US010118660B2

(12) United States Patent
Cooper (10) Patent No.: US 10,118,660 B2
(45) Date of Patent: Nov. 6, 2018

(54) SMARTPACK DEVICE FOR A BIKE (71) Applicant: Peter Cooper, Fishing Point (AU)

(72) Inventor: Peter Cooper, Fishing Point (AU)

(73) Assignee: Peter Cooper, Fishing Point, New South Wales (AU)

( * ) Notice: Subject to any disclaimer, the term of this patent is extended or adjusted under 35 U.S.C. 154(b) by 10 days.

(21) Appl. No.: 15/583,809

(22) Filed: May 1, 2017

(65) Prior Publication Data
US 2017/0327173 A1 Nov. 16, 2017

Related U.S. Application Data (60) Provisional application No. 62/336,583, filed on May 14, 2016.

(51) Int. Cl.
*B62J 99/00* (2009.01)
*G01C 21/26* (2006.01)
(Continued)

(52) U.S. Cl.
CPC ............... *B62J 99/00* (2013.01); *B62J 9/02* (2013.01); *G01C 21/265* (2013.01);
(Continued)

(58) Field of Classification Search
CPC ........ B62J 99/00; B62J 9/02; B62J 2099/002; B62J 2099/0013; B62J 2099/0033;
(Continued)

(56) References Cited

U.S. PATENT DOCUMENTS

2007/0164068 A1* 7/2007 Godshaw ............... B62J 9/008
 224/430
2010/0012696 A1* 1/2010 Prager .................... B62J 9/005
 224/417

(Continued)

FOREIGN PATENT DOCUMENTS

DE 202014005839 U1 * 9/2014 ............. B62J 9/003
JP H08142954 A * 6/1996

OTHER PUBLICATIONS

"Rob's Run and Ride Blog", an article entitled "Gear: Axiom Smartbag Touch" published by Rob Reid on Feb. 1, 2016 http://robrunandride.blogspot.conn/2016/02/gear-axiom-smartbag-touch.htnnl.*

*Primary Examiner* — Rodney A Butler (57) ABSTRACT

Disclosed is a smartpack device detachably attached to chassis of a bike. The bike includes peripheral electrical devices. The smartpack device includes a housing, a separating assembly, a locking unit, plurality of indication units, a battery unit, a door, a computer and a battery unit to power the peripheral electrical devices of the bike, computer and plurality of indication units. The plurality of indication units is configured on the housing to emit light to indicate status of each peripheral electric device of the bike. The door connected to the housing to allow access to the battery. The computer is configured on the housing includes a memory unit to store plurality of modules, a touch display unit to display processed plurality of modules and to receive touch commands from a user to access the plurality of modules and the processing unit to process the plurality of modules and is coupled to the memory unit. The plurality of modules includes a navigation module to display navigation route information on the touch display unit, and a control module controls at least one of plurality of indication units to (Continued)

indicate status of the electrical peripheral devices on receiving commands through touch display unit.

15 Claims, 5 Drawing Sheets

(51) Int. Cl.
*B62J 9/02* (2006.01)
*H04N 7/18* (2006.01)
(52) U.S. Cl.
CPC .. *B62J 2099/002* (2013.01); *B62J 2099/0013* (2013.01); *B62J 2099/0033* (2013.01); *H04N 7/183* (2013.01)
(58) Field of Classification Search
CPC ....... B62J 6/001; B62J 6/04; B62J 7/02; B62J 3/00; B62J 2099/0006; B62J 2099/0026; G01C 21/265; H04N 7/183
See application file for complete search history.

(56) References Cited

U.S. PATENT DOCUMENTS

2015/0102919 A1* 4/2015 Hsu ................ B62J 6/001
340/432
2017/0245626 A1* 8/2017 Nehmad .............. A45F 4/00

\* cited by examiner

FIG. 5

SMARTPACK DEVICE FOR A BIKE

CROSS-REFERENCE TO RELATED APPLICATION

This application claims the benefit of U.S. Provisional Application Ser. No. 62/336,583, filed on May 14, 2016, which is incorporated herein by reference.

BACKGROUND OF THE INVENTION

1. Field of the Invention

The present invention generally relates to a device detachably attached to the bike, and more particularly relates to a smartpack device having multiple electronic features to increase efficiency of a rider while riding the bike.

2. Description of Related Art

Recently, interest in alternative energy has increased that has led to use of electrical bikes. E-bikes are becoming popular and becoming more used for commuting. The bike may include a frame equipped with rotatable wheels and a tire attached to the wheels. In addition, one or more pedals for driving the wheels and therefore a driving force generated by driving the pedals is transferred to the wheels through a chain.

For this reason, when a person moves a long distance or climbs a hill while riding a bike, he/she consumes much energy. For this, electrical bikes have been developed as alternatives to manual bikes in which a rider has to pedal to spin a wheel using manpower.

However, there are many things the rider needs to sort out before the ride. Such as charging the main battery, charging the front light, charging the rear light, charging any other devices, checking the bike over for any issues, plan the trip, check the weather, make sure they pack the charger(s), wet weather gear, tools, gloves and helmet.

Therefore there is a need of a smartpack device to detachably attach with the chassis of a bike to increase the efficiency of rider while riding. Further, the smartpack device should include plurality of electronic components such as display screen, control buttons to change mode of riding bike, speakers, and a computer to communicate wirelessly over a network.

SUMMARY OF THE INVENTION

In accordance with teachings of present invention, a smartpack device detachably attached to chassis of a bike is provided.

An object of the present invention is to provide a smartpack device including housing, a separating assembly, a locking unit, plurality of indication units, a door, a computer, and a battery unit. The housing is configured to detachably fit in the chassis of the bike. The housing is having an open left portion, a closed right portion, a top portion, a bottom portion, a front portion and a rear portion.

The separating assembly is detachably positioned between the top portion and the bottom portion to divide the left portion in a first portion and a second portion. The locking unit is configured on the rear panel to detachably lock the housing to the bike.

The plurality of indication units is configured on the top portion of the housing to emit light to indicate status of peripheral electric devices of bike. The door is pivotally connected to the bottom portion of the housing to cover the left portion. The door is opened to allow access to the battery unit.

The computer is configured on the top portion. The computer includes a memory unit, a touch display unit, and a processing unit. The memory unit stores plurality of modules. The touch display unit displays the processed plurality of modules and to receive touch commands from a user to access the plurality of modules.

The processing unit is coupled to the memory unit and the touch display unit to process plurality of modules. The plurality of modules includes a GPS module, a navigation module and a control module. The battery unit is configured to rest in the second left portion of the housing and connected to power the computer, the plurality of indication units and the bike electrical peripheral devices.

Another object of the present invention is to provide the smartpack device with a battery holder configured to support the battery unit in the second left portion of the housing. The smartpack device further includes plurality of buttons configured on the top portion to directly access the plurality of modules.

Another object of the present invention is to provide the smartpack device with a warning light configured on the top portion and further connected to the computer to illuminate when the battery is not sufficiently charged. The smartpack device further includes a tool kit to stick on the door such that when the door closes the tool kit moves below the battery unit.

These and other features and advantages will become apparent from the following detailed description of illustrative embodiments thereof, which is to be read in connection with the accompanying drawings.

DETAILED DESCRIPTION OF DRAWINGS

While this technology is illustrated and described in a preferred embodiment, a smartpack device attached to chassis of a bike may be produced in many different configurations, shape, sizes, forms and computer languages. This is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

Figure 1:
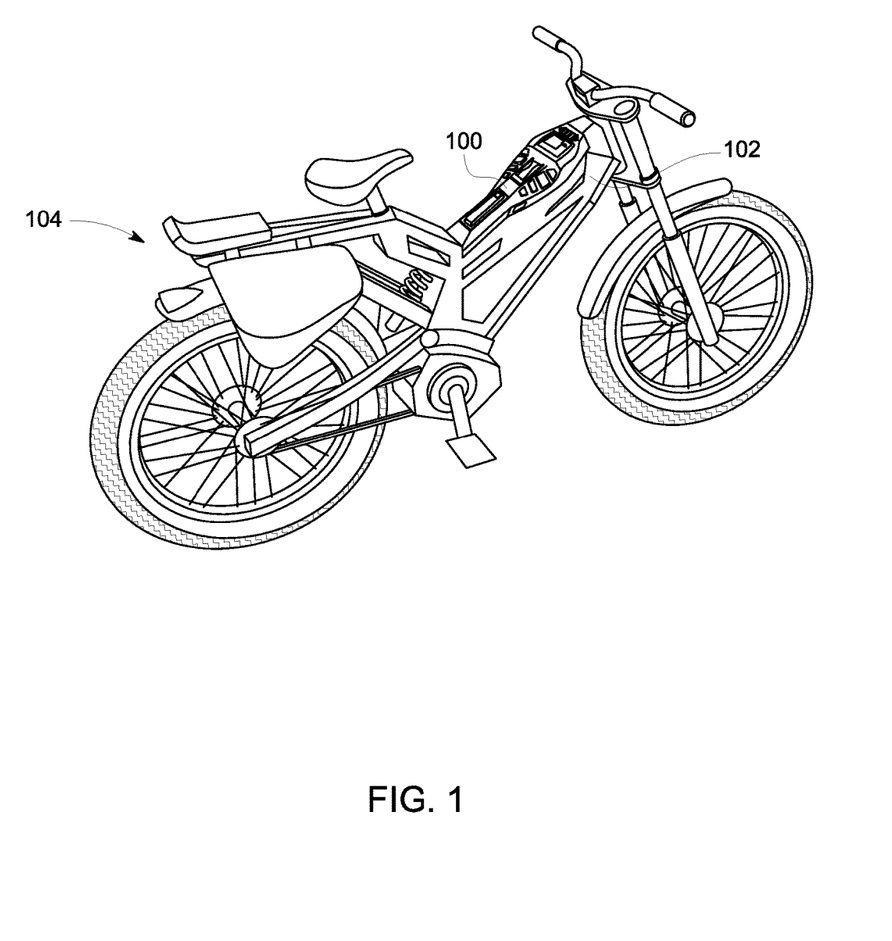
FIG. 1 illustrates a side perspective view of a smartpack device attached to chassis of a bike in accordance with a preferred embodiment of the present invention.

FIG. 1 illustrates a side perspective view of the smartpack device 100 attached to chassis 102 of a bike 104 in accordance with a preferred embodiment of the present invention. The bike 104 includes peripheral electrical devices. Examples of peripheral electrical devices include but not limited to front lights, rear lights, indicator lights, high beam light, rear camera etc. The smartpack device 100 is explained in detail in conjunction with FIG. 2 to FIG. 5 of the present invention.

Figure 2:
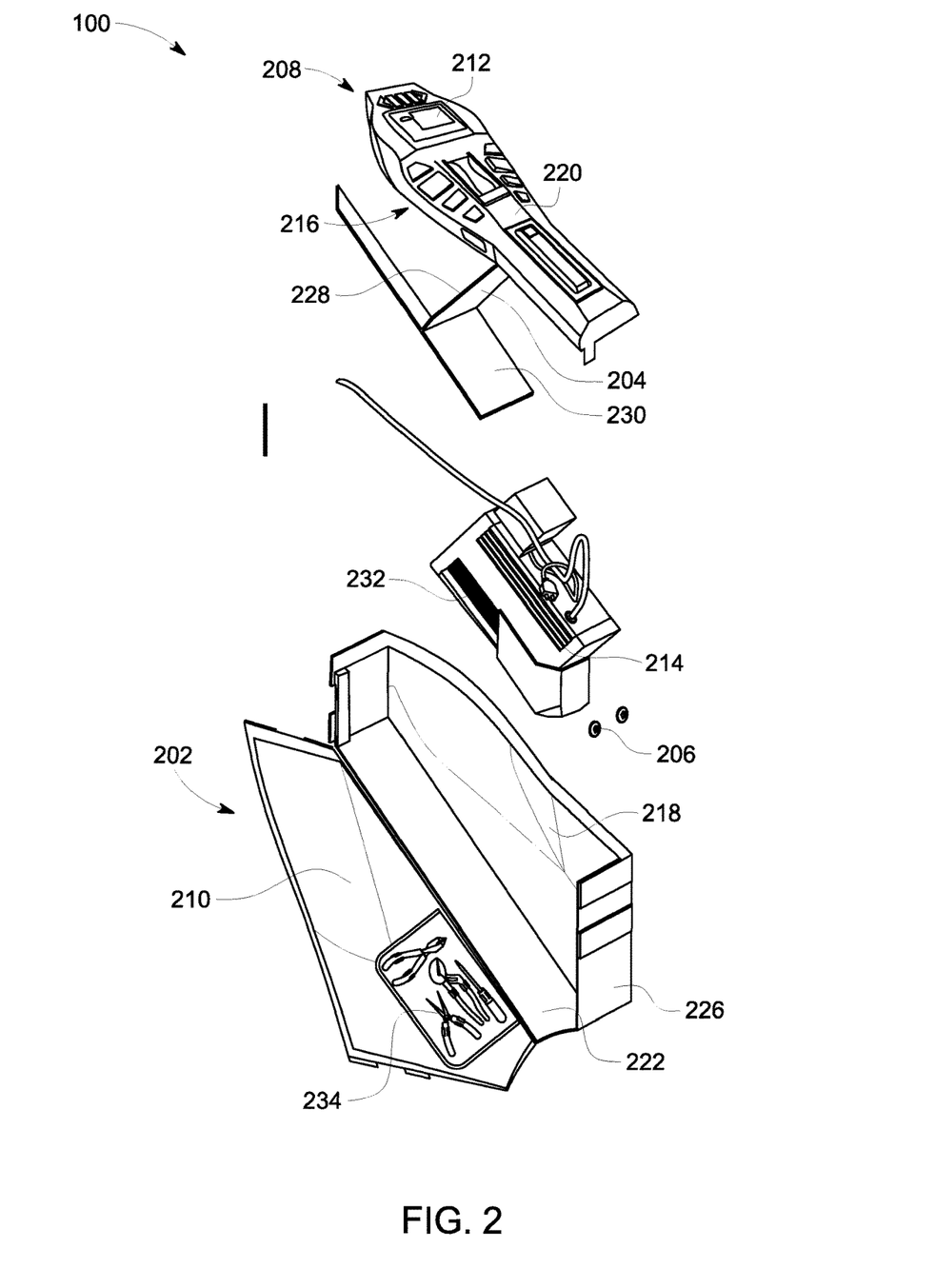
FIG. 2 illustrates an exploded view of the smartpack device in accordance with a preferred embodiment of the present invention.

FIG. 2 illustrates an exploded view of the smartpack device 100 in accordance with a preferred embodiment of the present invention. The smartpack device 100 includes a housing 202, a separating assembly 204, a locking unit 206, plurality of indication units 208, a door 210, a computer 212 and a battery unit 214.

The housing 202 is configured to detachably fit in the chassis (102, shown in FIG. 1) of the bike (104, shown in FIG. 1). The housing 202 includes an open left hollow portion 216, a closed right portion 218, a top portion 220, a bottom portion 222, a front portion (224, shown in FIG. 3) and a rear portion 226.

The separating assembly 204 is detachably positioned between the top portion 220 and the bottom portion 222 to divide the left hollow portion 216 in a first left hollow portion 228 and a second left hollow portion 230. In a preferred embodiment of the present invention, the separating assembly 204 is an inverted T-shaped body to divide the left hollow portion 216 of the housing 202.

The locking unit 206 is configured on the rear portion 226 to detachably lock the housing 202 to the bike (104, shown in FIG. 1). Examples of the locking unit 206 include but not limited to screw, nut, bolt etc. The plurality of indication units 208 is explained in detail in conjunction with FIG. 3 of the present invention.

The battery unit 214 is configured to rest in the second left hollow portion 230 of the housing 202 and connected to power the plurality of indication units 208 and the electrical peripheral devices of the bike. The door 210 is pivotally connected to the bottom portion 222 of the housing 202 to cover the left hollow portion 216. The door 210 opens to allow access to the battery unit 214.

The computer 212 is configured on the top portion 220 to receive power from the battery unit 214. The computer 212 includes a memory unit to store plurality of modules, a touch display unit and a processing unit. The computer 212 is explained in detail in conjunction with FIG. 3 of the present invention.

In another preferred embodiment of the present invention, the smartpack device 100 includes a battery holder 232 configured to support the battery unit 214 in the second left hollow portion 230 of the housing 202. Generally, the battery holder 232 is a plastic body shaped to receive the battery unit 214. The battery holder 232 further secures the position of the battery unit 214.

In another preferred embodiment of the present invention, the smartpack device 100 further includes a tool kit 234 configured to stick on the door 210. When the door 210 closes, the tool kit 234 is moved below the battery unit 214 i.e. in the second left hollow portion 230.

Figure 3:
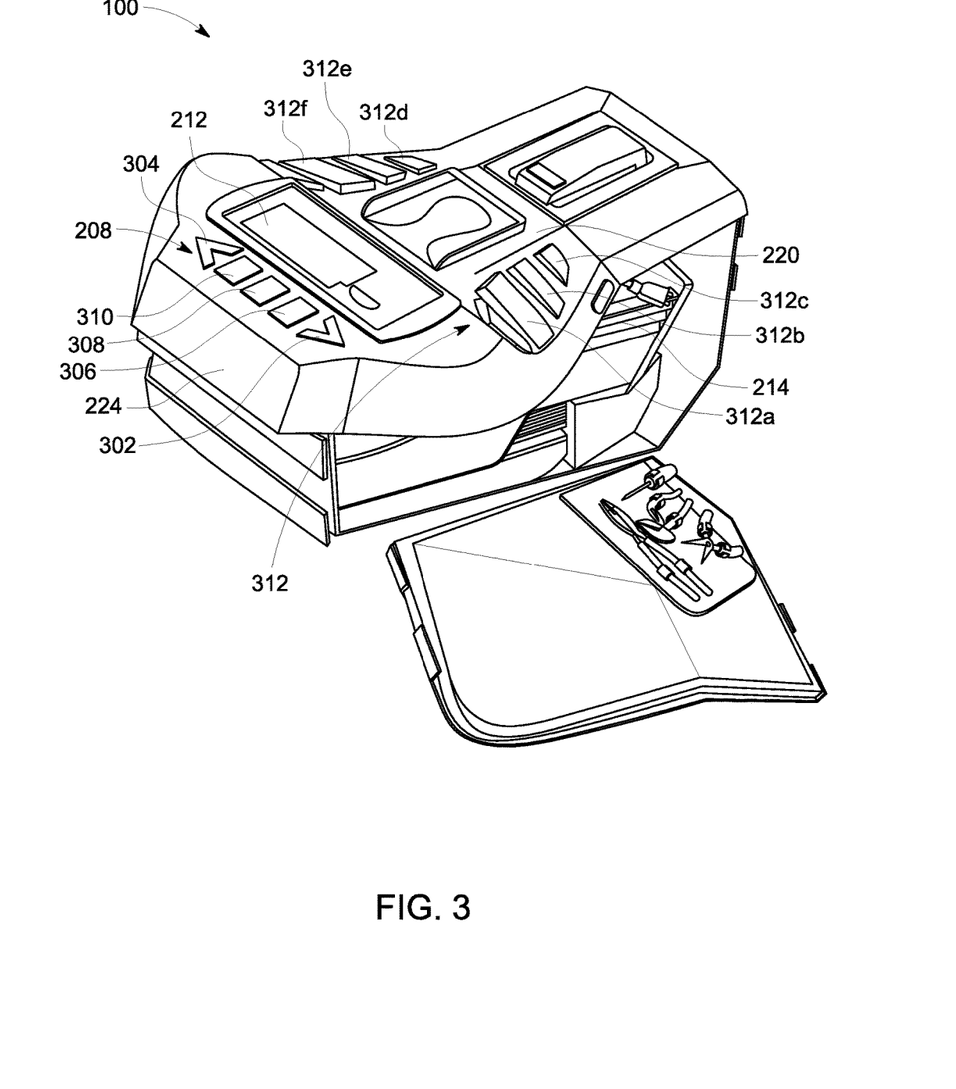
FIG. 3 illustrates a front perspective view of the smartpack device in accordance with a preferred embodiment of the present invention.

FIG. 3 illustrates a front perspective view of the smartpack device 100 in accordance with a preferred embodiment of the present invention. The plurality of indication units 208 include but not limited to a left indicator 302, a right indicator 304, a high beam indicator 306, a headlight indicator 308 and a warning indicator 310.

The computer 212 includes a memory unit to store plurality of modules. The touch display unit displays the processed plurality of modules. The touch display unit receives touch commands from a user to access the plurality of modules.

The plurality of indication units 208 are positioned on the top portion 220 and near to the front portion 224. In another preferred embodiment of the present invention, the plurality of indication units 208 are touch buttons. The plurality of indication units 208 may also be operated upon pressing.

The computer 212 processes to detect the charging status of the battery unit 214. When the battery unit 214 is not sufficiently charged, the warning indicator 310 is illuminated to indicate a warning sign for the rider. The warning indicator 310 may be pressed by the user to off the warning signal.

The processing unit is coupled to the memory unit and the touch display unit to process the plurality of modules. The plurality of modules includes a GPS module, a navigation module and a control module. The GPS module records the trip data at predetermined intervals and store in the memory unit.

The navigation module displays navigation route information on the touch display unit. The control module controls at least one of plurality of indication units 208 to indicate status of the peripheral electrical devices. The control module is able to receive touch commands through the touch display unit.

In another preferred embodiment of the present invention, the rider is also able to activate the peripheral electrical devices of the bike using the control unit stored in the computer 212. The activation of the peripheral electrical devices is indicated through the indication units 208.

For exemplary purposes, the rider wants to turn left and the rider activates the left indicator peripheral electrical device from the handle of the bike. The indication of turning left is shown on the left indicator 302. Similarly, activation of other electrical peripheral devices from the bike is reflected on the indication units 208 of the smartpack device 100.

In another preferred embodiment of the present invention, the plurality of modules includes a health application module, a no sweat application module, an air quality application module, a dashboard module, and a rear camera module.

The health application module improves health of the rider while riding the bike. The health application module provides various training to the rider for riding the bike. Examples of the training include but not limited to interval training, strength training, endurance training etc.

The no sweat application module provides best modes for riding the bike without breaking sweat. The no sweat application module measures the environmental conditions, the planned route, and rider performance to determine the maximum effort before the rider exerts themselves to the point of generating sweat.

The air quality application module provides information about the weather and air quality of the area. Further, the air quality application modules show the real-time Air Quality Index (AQI). The air quality module activates the warning indicator 310 when the air quality of the air is not favorable for the rider.

The rear camera module coupled to one of the peripheral electrical device such as a rear camera. The rear camera modules allow the rider to view the vehicles approaching from the rear side of the bike on the touch display unit. The dashboard module allows the user to direct access to each of the health application module, no sweat module, the air quality application module and the rear camera module.

The smartpack device 100 further includes plurality of buttons 312 such as 312a, 312b, 312c, 312d, 312e and 312f is configured on the top portion 220 to directly access the plurality of modules stored in the computer 212. The button 312a allows the user to direct access the health application module through the touch display unit of the computer 212.

The button 312b allows the user to direct access the no sweat application module through the touch display unit. The button 312c allows the user the direct access the air quality application module. The button 312d allows the user to directly activate the rear camera and view the rear images on the touch display unit.

The button 312e allows the user to directly open the dashboard module on the touch display unit. The button 312f allows the user to direct access to the navigation module through the touch display unit. In another preferred embodiment of the present invention, the buttons 312 may be reconfigured to access any of the plurality of modules.

Figure 4:
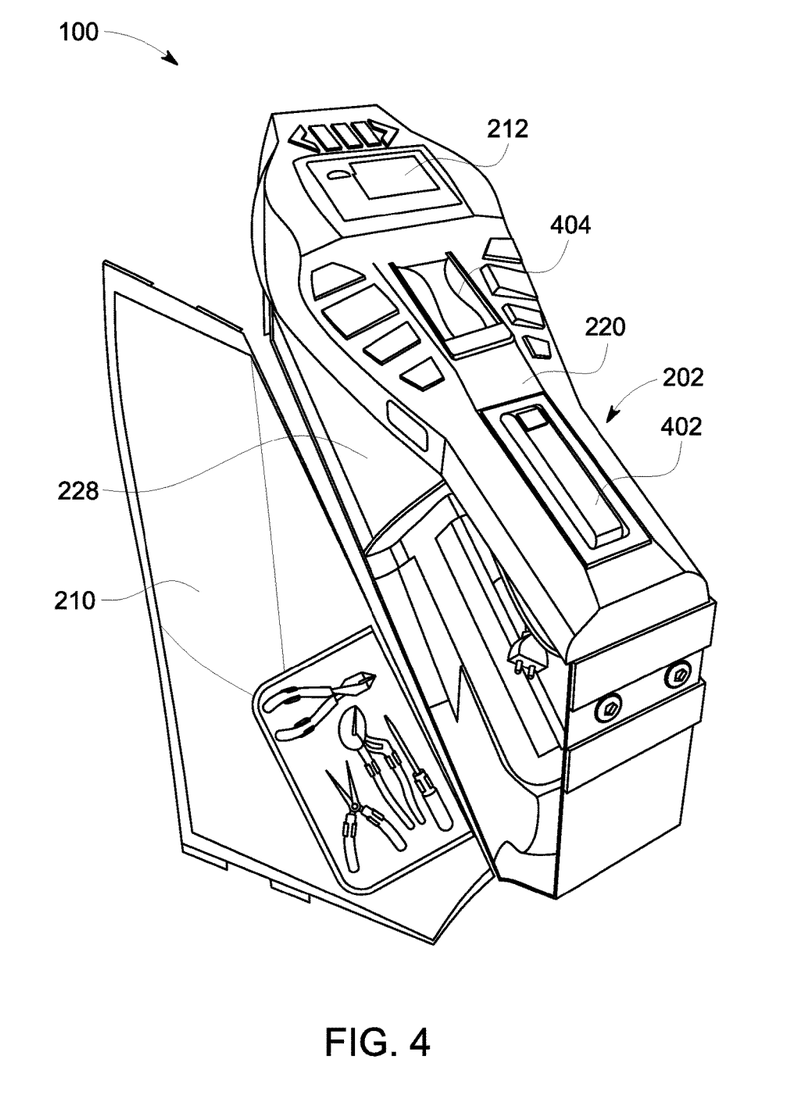
FIG. 4 illustrates a top perspective view of the smartpack device in accordance with a preferred embodiment of the present invention.

FIG. 4 illustrates a top perspective view of the smartpack device 100 in accordance with a preferred embodiment of the present invention. With reference to FIG. 1, the smartpack device 100 further includes a handle 402 embedded on the top portion 220 to carry of the housing 402.

The smartpack device 100 further includes a mobile phone holder 404 configured on the top portion 220 of the housing 202 between the handle 402 and the touch display unit of the computer 212. The mobile phone holder 404 is able to receive and hold any mobile phone.

The mobile phone holder 404 is having a bracket and a flexible body attached within the three sides the bracket. The bracket defines boundary and the flexible body adjust according to size of the mobile phone. The flexible body has an open side to receive the mobile phone.

With reference to FIG. 1, the second left portion 228 may be used to store articles like cleaning materials such as clothes, liquids, duster etc and other materials such as gloves, glasses, document etc. Further, the door 210 may be made up of various materials including but not limited to glass, plastic, fiber etc without deviating from the scope of the present invention.

Figure 5:
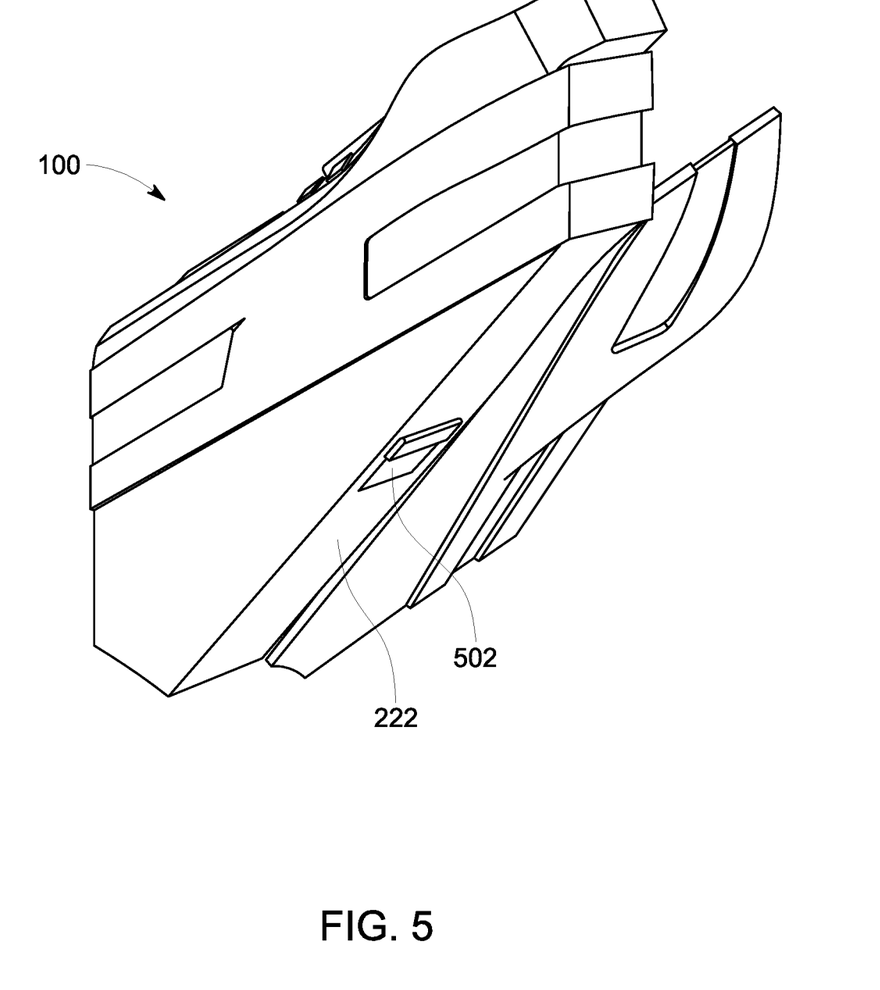
FIG. 5 illustrates a bottom perspective view of the smartpack device in accordance with a preferred embodiment of the present invention.

FIG. 5 illustrates a bottom perspective view of the smartpack device 100 in accordance with a preferred embodiment of the present invention. The smartpack device 100 further includes a passage 502 configured on the bottom portion 222 to allow electric cables of the peripheral electrical devices to reach the battery unit.

The present invention offers various advantages such as being able to detachably remove the smartpack device from the bike and may be charged at any location. Further the present invention offers security as the computer and battery are removed from the chassis of the bike. Further the present invention may be used to manage the fleet of bikes, by swapping the smartpack devices among bikes.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A smartpack device detachably attached to chassis of a bike, the bike having plurality of peripheral electrical devices, the smartpack device comprising:
   a housing configured to detachably fit in the chassis of the bike, the housing having an open left hollow portion, a closed right portion, a top portion, a bottom portion, a front portion and a rear portion;
   a locking unit configured on the rear portion to detachably lock the housing to the bike;
   plurality of indication units, wherein each indication unit configured on the top portion of the housing to emit light to indicate status of at least one of peripheral electric devices of the bike;
   a battery unit configured to rest in the left hollow portion of the housing, and further connected to power the plurality of indication units and the peripheral electrical devices of the bike;
   a door pivotally connected to the bottom portion of the housing to cover the left hollow portion, wherein the door opens to allow access to the battery unit; and
   a computer configured on the top portion to receive power from the battery unit, the computer comprising:
      memory unit to store plurality of modules and predetermined range of battery power;
      a touch display unit to display the processed plurality of modules and to receive touch commands from a user to access the plurality of modules; and
      a processing unit coupled to the memory unit and the touch display unit to process the plurality of modules, wherein the plurality of modules comprising:
         a navigation module to display navigation route information on the touch display unit; and
         a control module controls at least one of plurality of indication units to indicate status of the peripheral electrical devices on receiving commands through the touch display unit.

2. The smartpack device according to claim 1 further comprising a separating assembly detachably positioned between the top portion and the bottom portion to divide the left hollow portion in a first left hollow portion and a second left hollow portion.

3. The smartpack device according to claim 1 further comprising a battery holder configured to support the battery unit in the left hollow portion of the housing.

4. The smartpack device according to claim 1 further comprising plurality of buttons configured on the top portion to directly access the plurality of modules stored in the computer.

5. The smartpack device according to claim 1 wherein the plurality of indication units comprising a warning indicator configured on the top portion; further the warning indicator connected to the computer to illuminate when the battery power is below the pre-determined range.

6. The smartpack device according to claim 1 further comprising a tool kit configured to stick on the door, such that when the door closes the tool kit moves below the battery unit in the left hollow portion.

7. The smartpack device according to claim 1 further comprising a handle embedded on the top portion to carry the housing.

8. The smartpack device according to claim 6 further comprising a mobile phone holder configured on the top portion of the housing between the handle and the touch display unit.

9. The smartpack device according to claim 1 further comprising a passage configured on the bottom portion to allow electric cables of the peripheral electrical devices to reach the battery unit.

10. The plurality of modules according to claim 1 further comprising a GPS module to record the trip data at predetermined intervals and store in the memory unit.

11. The plurality of modules according to claim 1 further comprising a health application module to improve health of the rider by providing various training to the rider for riding the bike.

12. The plurality of modules according to claim 1 further comprising an air quality module to provide information on weather and air quality of the area to the rider.

13. The plurality of modules according to claim 1 further comprising a no sweat application module to measure environmental conditions, planned route and rider performance to determine maximum effort before the rider exerts themselves to the point of generating sweat.

14. The plurality of modules according to claim 1 further comprising a rear camera module coupled to one of the peripheral electrical device of the bike, the rear camera module to display the rear view from the rear portion of the bike on the touch display unit.

15. The smartpack device according to claim 1 wherein the plurality of indication units are touch buttons to receive touch commands from the rider to activate the peripheral electrical devices of the bike.

\* \* \* \* \*